Sept. 18, 1951  R. GOURDON  2,568,617
DETACHABLE DENOMINATIONALLY-COMPOSITE KEYBOARD AND
DIFFERENTIAL ACTUATOR UNITS
Filed March 16, 1946  3 Sheets-Sheet 1
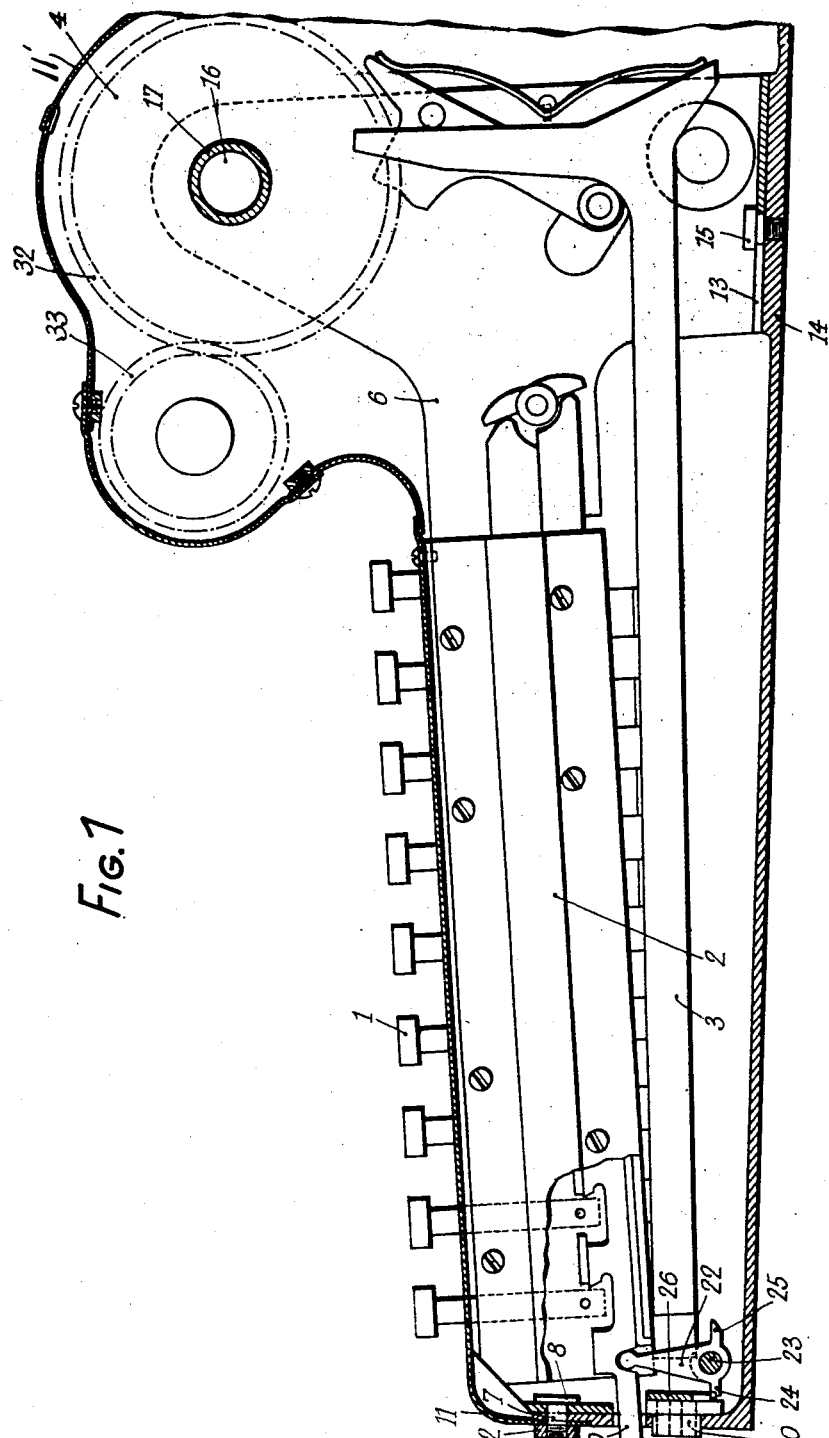

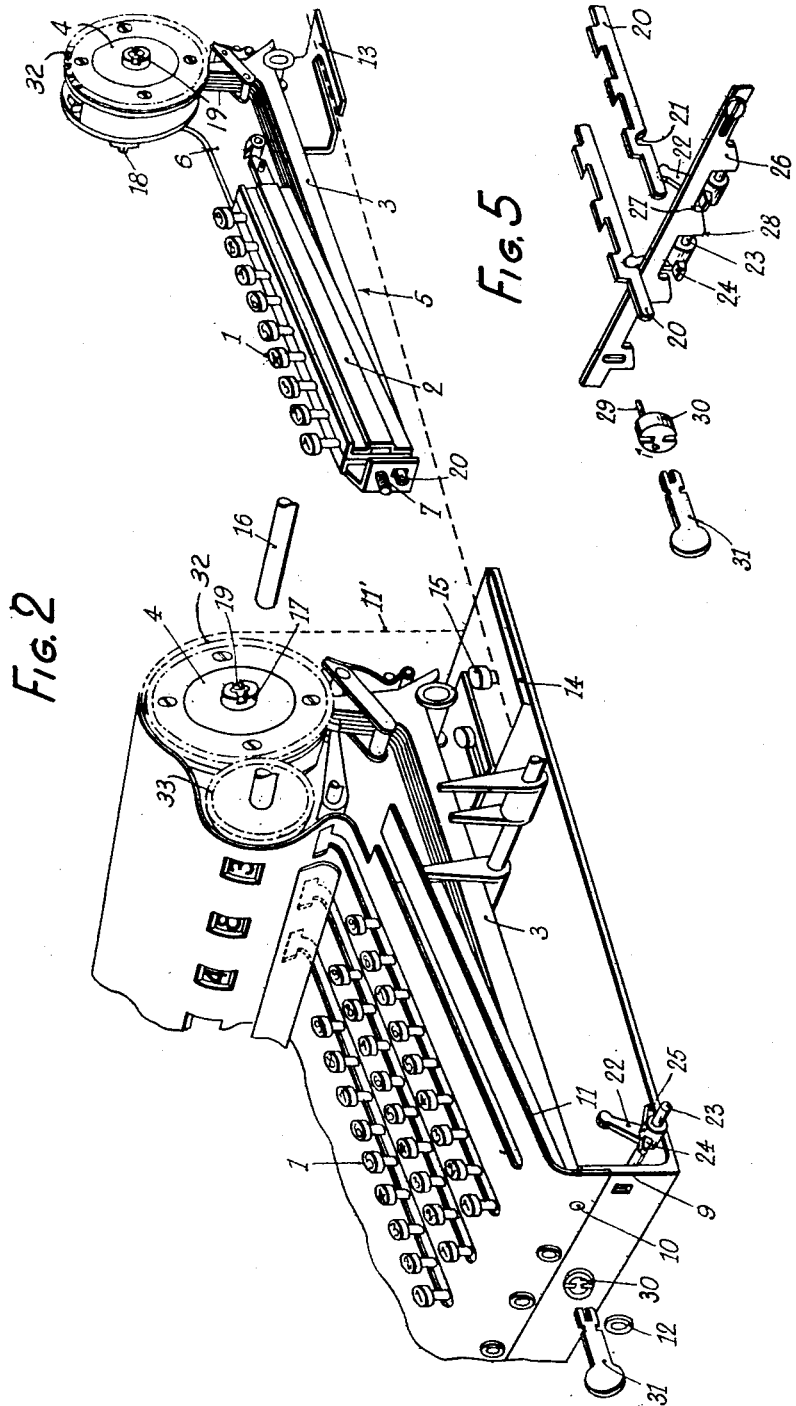

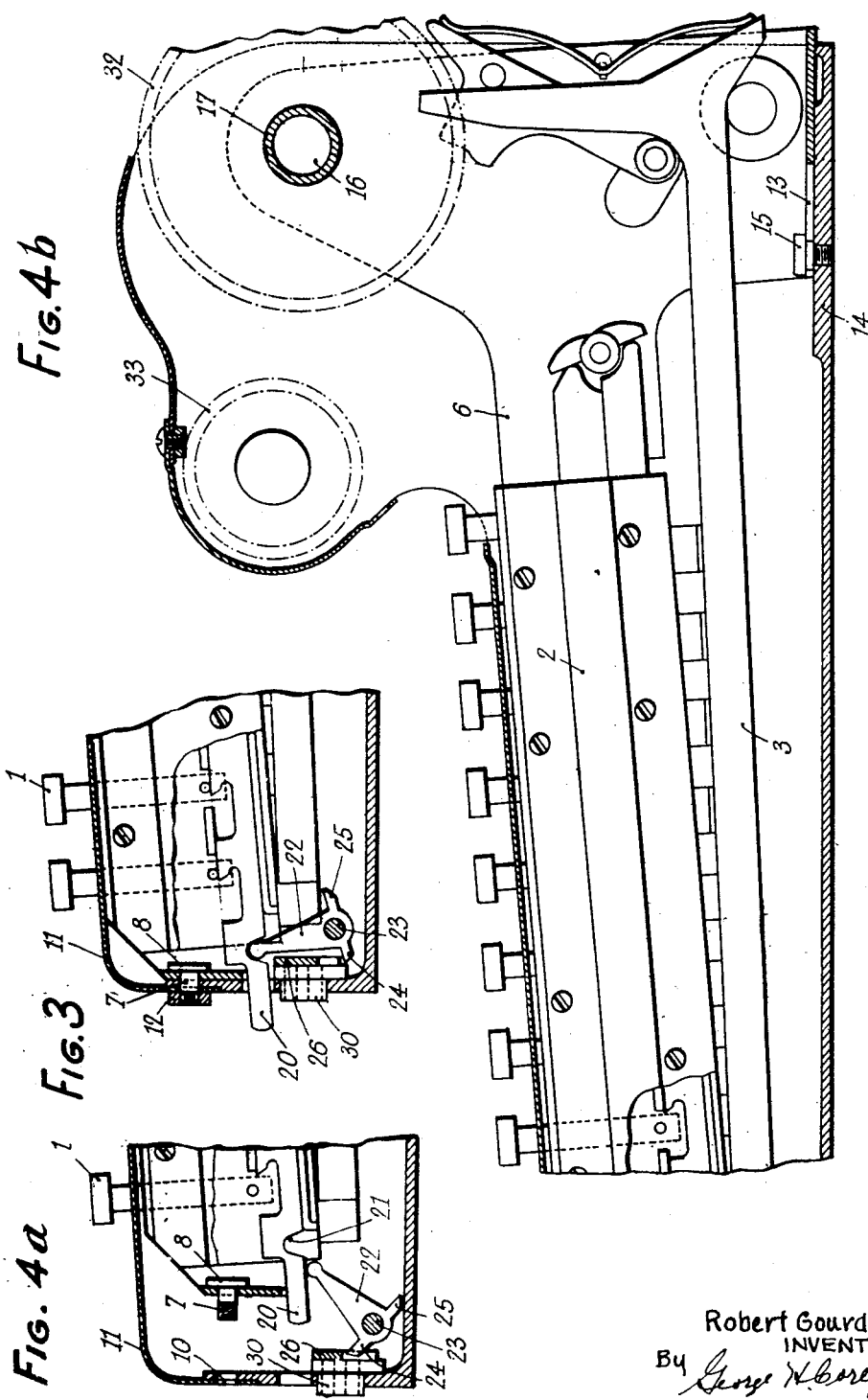

Patented Sept. 18, 1951

2,568,617

UNITED STATES PATENT OFFICE 2,568,617

DETACHABLE DENOMINATIONALLY COMPOSITE KEYBOARD AND DIFFERENTIAL ACTUATOR UNITS

Robert Gourdon, Paris, France, assignor to Centre d'Etudes M. B. A. (Mecanique, Balistique, Armement), Paris, France Application March 16, 1946, Serial No. 654,837
In France February 21, 1945

Section 1, Public Law 690, August 8, 1946
Patent expires February 21, 1965

7 Claims. (Cl. 235—79)

This invention relates to keyboard operated business machines which are built up of separable, replaceable units.

Calculating machines and the like are well known in the art wherein portions thereof may be handled separately during assembly and disassembly. Such portions have commonly been separated according to their function. For example, a machine may be separated into a keyboard unit, a printing unit, a registry unit, etc. Such unitary parts are each comparatively massive, embodying a greater number of assembled elements and mechanisms, and each unit constitutes a large and considerable portion of the machine. Because of the size of such unitary parts and the high cost of each and also because of the rather highly skilled operations involved in assembling and disassembling the machines, it has not been practical to provide the user with spare units for substitution for such unitary parts in case of breakdown. The use of such spare replacement units would be desirable since an immediate replacement of a disabled unit would avoid a prolonged period during which the machine is not usable.

My invention has for its primary object the provision of a key-controlled accounting or calculating machine or the like which is so constructed and arranged that, as a practical matter, spare units of an interchangeable character may be supplied by the manufacturer to the user whereby the user may quickly and without difficulty or the need to employ competent skilled help replace any unit of the machine so that the machine may be maintained in operation while repairs to the unit or units take place.

Another object of my invention resides in providing a calculating machine and the like of the foregoing character in which that portion of the machine forming the key-operated control mechanism and differential actuating mechanism controlled thereby for operating the registering mechanism and the like is composed of a plurality of unitary parts, preferably interchangeable, and each of which comprises a single row of keys representing the denominational order, motion transmitting mechanism operated by the keys and a differential actuating mechanism controlled by the transmission bars and operable to drive and control a registering mechanism with which the unit is operatively coupled when in assembled relation in the machine.

According to a further object of my invention, each unit is mounted on a supporting element, which element is provided at one of its ends, for example, the front end, with means for securing it to the front end of the frame of the machine while said supporting element is provided at the opposite or rear end thereof with means for slidably guiding said supporting element into its proper assembled position in the machine.

Still another object of my invention resides in providing a machine comprising unitary parts of the above character, or a unitary part for such machine, wherein the input or driving shaft for the differential actuating mechanism embodied therein is hollow and provided with coupling means at both ends thereof whereby the hollow shafts of adjacent units may be operatively coupled together in drive transmitting relation, and a spindle is inserted through the aligned hollow shafts of adjacent units for holding said shafts in coupled relationship.

Another object resides in providing a unit of the character last described in which the ends of the hollow shaft sections are formed of complementary configurations whereby to interfit with adjacent shaft sections; and, more specifically, it is an object of this invention to provide said hollow shafts at one end with a tooth and at the other end with a recess for receiving a similar tooth.

According to another feature of my invention, there is provided a locking member for the above mentioned elementary units controlled by a removable key with a view to avoiding any even partial dismantling of the machine without authorization. This member may be the same as that which holds the machine-controlling keys in position and thus prevents any unauthorized operation of the machine.

Further features and advantages of my invention will appear from a consideration of the following description and the accompanying drawings, which illustrate diagrammatically and solely by way of example, one embodiment of my invention. In said drawings:

Fig. 1 is an elevational side-view partly in section of a unit including a row of keys mounted in a calculating machine.

Fig. 2 is a fragmentary perspective view of a portion of a calculating machine improved in accordance with my invention and showing one unit, including a row of keys, removed from the machine.

Fig. 3 is a longitudinal section of the front part of one unit of the machine illustrating the parts in their locked positions.

Figs. 4a and 4b, taken together, form a view similar to Fig. 1 showing one unit partially removed from the machine.

Lastly, Fig. 5 is a perspective view of the mechanism for locking the units.

As shown in the drawings the keys 1 are connected to motion transmitting bars 3 by mechanism enclosed in a casing 2.

Each separable ordinal unit of the machine, one of which is generally indicated at 5 in Fig. 2, is composed of a row of keys representing a certain denominational order, transmission bars 3 actuated thereby, and differential actuating mechanism 4 for said denominational order. The differential actuating mechanism is adapted to actuate a registering mechanism or the like which is supported on the frame of the machine, and is not a part of the separable unit. My copending U. S. application Serial No. 654,836, filed March 16, 1946, discloses and claims one form of differential actuating mechanism which is suitable for use in connection with the present invention. My copending U. S. application Serial No. 654,835, filed March 16, 1946, now Patent No. 2,522,671, issued September 19, 1950, discloses completely and claims motion transmitting mechanism for connecting the keys to the differential actuating mechanism and suitable for use in connection with the present invention. All the above mentioned parts forming each unit are mounted on a frame plate 6 carrying at its front end a threaded stud 7 which may be riveted to the front folded portion of said frame plate 6 or made rigid therewith by any other suitable means. An abutment or head 8 (Fig. 1) is formed at the end of the stud 7 for holding the same. Said stud may pass through an opening in the front plate 9 of the general machine frame, and also through an opening 10 in hood 11 enclosing the mechanism. The parts are held in assembled relation by a nut 12.

In order to provide for the mounting of the ordinal unit inside the general frame of the machine, the frame plate 6 carrying the parts of each unit is provided at its rear end with a slide or slotted plate 13, best shown in Fig. 2. This slide 13 is adapted to slide over the rear portion of the base plate 14 of the machine frame, being guided and retained by means of a threaded stud 15 having a knurled knob and disposed to be received within the slot in the plate 13. Preferably the knob 15 is screwed into the base plate 14 and may serve thus for securing the ordinal unit 5 in its assembled position.

As best shown in Fig. 2, the different ordinal units 5 corresponding to the different orders of the values to be registered are assembled together by means of an assembling spindle 16 passing through the aligned hollow shaft sections 17, which sections are adapted to drive the differential actuators 4. Moreover, the ends of each hollow shaft section 17 are shaped with a tooth 18 at one end and a recess 19 at the other for receiving such a tooth, whereby the drive transmission of the different units may be operatively coupled together by the interengagement of the adjacent hollow shaft sections 17 through the engagement of the tooth 18 of one shaft section with the recess 19 of the next.

In order to prevent any dismantling by an unauthorized person, I connect a suitable member of each ordinal unit to a locking mechanism which may be operated for instance by a removable key. The chosen member of the unit 5, which in the example illustrated, is a sliding bar 20 which locks the keys 1, is provided near its front end with a notch 21 disposed to be engaged by the end of a lever 22 pivotally mounted on a spindle 23 and provided with two lugs 24 and 25. The lug 24 cooperates with a transversely slidable bar 26, best shown in Fig. 5, which is provided with notches 27 and locking cam surfaces 28. This bar may be operated through a stud 29 carried by a sleeve 30 actuated by a key 31. A weak spring (not shown) biases the lever 22 clockwise as viewed in Figs. 3 and 4a so that it bears against the bar 20. The lug 25 serves to engage the bottom plate 14 and thereby limit the rotation of lever 22 when its end passes out of the notch 21 during the removal of a unit 5 (see Figs. 2 and 4a). When the lock operated by the key 31 is opened, the transverse bar 26 occupies a position in which the lugs 24 on the levers 22 appear in front of the notches 27 and thereby allow said levers 22 to rock rearwardly, as illustrated in Fig. 5. This allows the ends of the different levers 22 to move out of the notches 21 in the sliding bars 20 forming part of the unit 5 whereby they may be displaced rearwardly for removal. When the lock operated by the key 31 has been closed, the transverse bar 26 acts through its locking slopes or cam surfaces 28 to lock all the lugs 24 on the levers 22 which are thus fixed against movement. Nobody can, under such conditions, remove any of the ordinal units 5. In other words, the locking of the accounting machine prevents any dismantling, even of a partial character, in the absence of the removable key.

The position of the locking device illustrated in Fig. 1 is the position thereof in which the ordinal units 5 are released and may be removed from the machine and in which the keys 1 are free and may be operated. The position of the parts illustrated in Fig. 3 is the position in which the ordinal units 5 and the keys thereof are locked. Lastly, the position of the parts in Figs. 4a and 4b is the position when a unit 5 is being removed.

To accomplish the removal of an ordinal unit, lever 22 is released by key 31, the rear portion 11' of hood 11 is removed, nut 12 is removed, knob 15 is released and spindle 16 is withdrawn from the hollow shaft sections 17, whereupon the unit 5 may be slid rearwardly, this rearward movement being possible because the toothed couplings between the shaft sections are horizontally positioned when the drive transmission mechanism dwells between operations of the machine. Hence, each unit is separately slidable in a rearward direction and completely separable from the machine. During this movement the driving gear 32 of the differential actuator 4 of the block considered simply moves away from the toothed wheel 33 of the corresponding number-carrying drum, which remains in place during this dismantling.

For assembling an ordinal unit, the sequence of operations should be reversed.

Consequently it is possible to remove and to replace very easily any ordinal unit comprising a single row of keys and associated mechanisms above described, the mechanism of which is faulty. If it is a simple repair job, the user may generally make repairs without returning it to the manufacturer. The importance of this arrangement will be understood if it is considered that when the mechanism corresponding to a given row of keys forms part of a complete machine, which cannot be separated into units, then the elements of one ordinal section cannot be reached easily without a lengthy and costly dismantling of the whole machine.

If the mechanism is damaged, the block or unit may be replaced rapidly while the mechanism is being repaired, if reparable. This may be done when the user has one or two spare units, which is entirely practical because of the comparatively small fractional part of the entire machine which each block or unitary part constitutes and because of the comparatively small cost of each unitary part. If the user does not keep a spare unit, the manufacturer or dealer may provide him with one immediately. In all cases, the storing of a very small number of spare units by the user and of large numbers thereof by the manufacturer or dealer is not prohibited by the high cost prices of such spare parts, as in the case of machines wherein the ordinal keys and differential actuators form a system which cannot be dismantled otherwise than as comparatively large sections of the whole machine.

It should be noticed that the different units corresponding to the different rows are interchangeable.

In all cases, the machine remains fit for use during repair, and in many cases the user may himself provide for the immediate restarting of the machine.

The arrangement including independent units corresponding to the different rows of keys makes upkeep of the machine much easier, as the user may dismantle the mechanism row by row for inspecting or for lubricating purposes.

Lastly, by reason of said easy dismantling, assembly, and the operative correlation of the various unitary parts, it is not necessary to provide space between the units or members of the machine in order to allow easy access thereto. This permits a much more compact arrangement than in previous machines.

Of course, the arrangement which forms the object of my invention is applicable not only to the machines of the type illustrated in the drawings, but may be adapted to other types of accounting machines including rows of keys for the setting of values, such as adding machines, multiplying machines and the like.

Of course, the above described mounting means for the ordinal units, may be somewhat modified without departing from the scope of the present invention. Thus, the members or means shown and described for securing the different ordinal units to the frame of the machine may be replaced by any other equivalent means. Similarly the means for interconnecting the drive transmission mechanism such as the tooth and recess constructions provided at the ends of the hollow shafts 17 may be replaced by any other equivalent devices, such, for example, as by parallel claw systems, frictional couplings and the like, and any suitable coupling arrangement may be employed.

What I claim is:

1. In a key-set calculating machine including a totalizer having a plurality of ordinal totalizer wheels, a frame, and a casing including a keyboard portion, the improvement which comprises individually removable parallel spaced ordinal units for operating said totalizer wheels, each said unit including a row of keys, key-indexed members and differential actuating mechanism controlled by said members and operable to actuate the associated totalizer wheels, said casing having parallel spaced slots in said keyboard portion for receiving said rows of keys, each slot having one end contoured to form an exit opening through which the associated row of keys may pass during removal of the unit, and means for fastening said units to said frame with said keys projecting through the slots and said differential actuating mechanisms operatively connected to the totalizer wheels.

2. The machine of claim 1, in which each unit includes a vertical frame plate and a slotted flange member attached to said frame plate, and means for fixing said flange member and frame plate on said machine frame.

3. The machine of claim 1, in which said frame is provided with locating apertures in the front end thereof, and each unit includes a frame plate and means projecting at the front end of said frame plate for cooperation with one of said apertures to position said unit with respect to said frame.

4. The machine of claim 1, including a transverse bar extending across the front end of the machine frame underneath all of the units, a sliding bar in each unit and provided with a notch on the under side of its front end, rocking levers pivotally mounted on the machine frame under said sliding bars, each lever having an upstanding arm dimensioned to engage the notch on the bar above it when said arm is vertical, but to disengage said notch when said lever is rocked to one of its end positions, and means including said transverse bar for locking the levers with their arms in said notches.

5. The machine of claim 4, in which said transverse bar is movable to lock and unlock said levers, and means including a lock operable by a removable key for moving said transverse bar.

6. In a key-set calculating machine including a totalizer having a plurality of ordinal totalizer wheels, a frame, and a casing having a keyboard portion, the improvement which comprises individually removable parallel spaced ordinal units for operating said totalizer wheels, each said unit including a row of keys, key-indexed members and differential actuating mechanism controlled by said members and operable to actuate the associated totalizer wheels, each said differential actuating mechanism including a drive shaft section extending laterally of the mechanism and having its ends formed to drivingly engage the adjacent shaft ends of the differential actuating mechanisms in the units on either side thereof, each said differential actuating mechanism also including a gear to drivingly engage a gear fixed to its associated totalizer wheel, said casing being slotted to permit insertion of said row of keys in place with respect to said keyboard portion, and means for individually attaching said units to said frame.

7. A machine as claimed in claim 6, in which said shaft sections are tubular, and including a tie rod extending through the shaft sections of all the units to hold said shaft sections in alignment.

ROBERT GOURDON.

REFERENCES CITED

The following references are of record in the file of this patent:

UNITED STATES PATENTS

| Number | Name | Date |
| --- | --- | --- |
| 1,010,849 | Brasseur | Dec. 5, 1911 |
| 1,285,156 | Hayes et al. | Nov. 19, 1918 |
| 1,344,191 | Teetor | June 22, 1920 |
| 1,371,526 | Teetor | Mar. 15, 1921 |
| 1,685,583 | Browning | Sept. 25, 1928 |
| 1,853,052 | Horton | Apr. 12, 1932 |
| 1,930,870 | Ball | Oct. 17, 1933 |